United States Patent [19]

Berkowitz et al.

[11] 4,414,384
[45] Nov. 8, 1983

[54] SYNTHESIS AND POLYMERIZATION OF 3-AZIDOOXETANE

[75] Inventors: Phillip T. Berkowitz, Woodbridge, Conn.; Kurt Baum, Pasadena; Vytautas Grakauskas, Arcadia, both of Calif.

[73] Assignee: The United States of America as represented by the Secretary of the Navy, Washington, D.C.

[21] Appl. No.: 388,049

[22] Filed: Jun. 14, 1982

[51] Int. Cl.$^3$ .............................................. C08G 65/22
[52] U.S. Cl. ..................................... 528/417; 528/408
[58] Field of Search ................................ 528/417, 408

[56] References Cited

U.S. PATENT DOCUMENTS 3,112,280 11/1963 Farthing .......................... 528/417 X
3,645,917 2/1972 Vandenberg ................... 528/417 X
4,268,450 5/1981 Frankel et al. ................. 528/417 X

OTHER PUBLICATIONS

Maklakova et al., Zhurnal Prikladnoi Spektroskopii, vol. 24, No. 4, pp. 673-676, Apr. 1976, (English Trans., pp. 481-483).

*Primary Examiner*—Lucille M. Phynes
*Attorney, Agent, or Firm*—R. F. Beers; K. E. Walden; R. D. Johnson

[57] ABSTRACT

3-Azidooxetane,

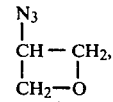

is prepared by reacting 3-oxetyl p-toluenesulfonate with an alkali metal azide in a polar solvent. In the presence of a Lewis acid catalyst, 3-azidooxetane polymerizes to form a poly(3-azidotrimethylene ether) of the formula

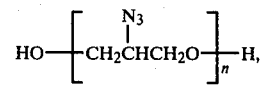

which can be cured with diisocyanates to form energetic, rubbery polyurethanes.

9 Claims, No Drawings

SYNTHESIS AND POLYMERIZATION OF 3-AZIDOOXETANE

BACKGROUND OF THE INVENTION

This invention relates to polyethers and more particularly to energetic polyethers containing azido groups.

Azido compounds and polymers are important in the fields of explosives and propellants because the azido group is highly energetic and relatively small in size. The size of the azido moiety imparts excellent polymer properties to the compound and enhances compatibility in polymer systems. An example of how the azido group improves the physical properties of a compound is found in U.S. Pat. No. 3,946,051, issued on Mar. 23, 1976 to James N. Haynes. The compounds are azido formates of omegahydroxyalky phthalates and their condensation polymers. Due to the largeness of the compounds in relation to the azido group, the compounds are considered nonenergetic. Their use is primarily as a surface modifying agent in order to improve the adhesive properties of polyesters.

Few energetic polymers are suitable for compounding propellants because of the severe physical-property requirements of propellants. The polymer must be capable of holding large quantities of solid ingredients as well as plasticizers. The polymers should have a low viscosity in order to facilitate propellant mixing, casting, and have a long pot life. The polymer should have exceptional thermal and chemical stability so that an explosive or propellant composition would have a long shelf life and good reliability. The polymer should also have a low sensitivity but a high energy content.

Wayne R. Carpenter, J. ORG. CHEM, 27, P. 2085+ at 2086, discloses 3,3-bis(azidomethyl)oxetane. Milton B. Frankel, et al in U.S. patent application Ser. No. 237,837, filed on Feb. 25, 1981, entitled "Azido Polymers and Preparation Thereof," disclosed the polymerization of 3,3-bis(azidomethyl)oxetane to form an energetic polymer possessing desirable properties.

Nevertheless, it would be desirable to provide polymers possessing still better properties such as thermal and impact stability and workability. In particular, it would be desirable to provide polymers in which the azido groups are attached directly to the polymer backbones.

SUMMARY OF THE INVENTION

It is, therefore, an object of the present invention to provide a new organic azido compound.

Another object of this invention is to provide a method of synthesizing a new organic azido compound.

A further object of the present invention to provide a propellant binder with excellent mechanical properties and a high energy content.

Yet another object of the present invention is to provide a propellant binder with excellent thermal and chemical stability.

A still further object of the present invention is to provide a propellant binder with low sensitivity.

Yet a further object of the present invention is to provide an explosive with excellent thermal and chemical stability at a low sensitivity.

These and other objects of this invention are accomplished by providing:

3-azidooxetane,

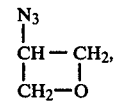

by reacting 3-oxetyl tosylate with an alkali metal azide. The 3-azidooxetane is polymerized in the presense of a lewis acid catalyst in an aprotic solvent to produce a polymer of the formula

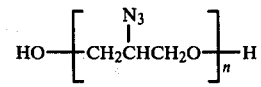

These polymers are useful in the preparation of energetic explosive and propellant binders.

DETAILED DESCRIPTION OF THE PREFERRED EMBODIMENT

The 3-azidooxetane is prepared by reacting 3-oxetyl p-toluenesulfonate (i.e., 3-oxetyl tosylate) with a metal azide in a polar organic solvent.

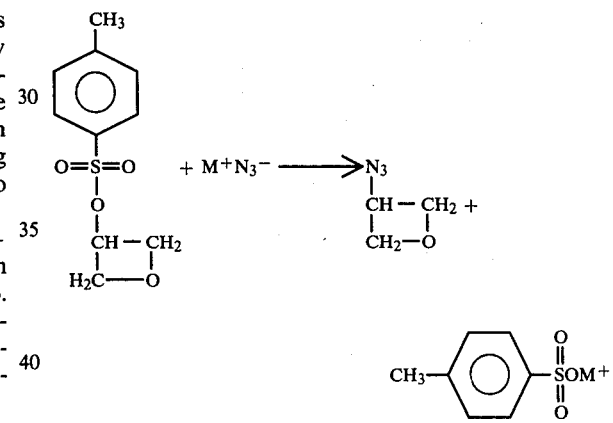

The tosylate group is displaced by metal azides in polar organic solvents. Sodium azide and potassium azide are the preferred metal azides, with sodium azide being the most preferred.

Preferred polar solvents for the synthesis of 3-azidooxetane include hexamethylphosphoramide, acetonitrile, and triethylene glycol. When hexamethylphosphoramide is the solvent, the reaction is run at a temperature of from room temperature (20° C.) to reflux temperature. When acetonitrile is used, the reaction may be run in the same range, but is preferably run at reflux. Note that a complexing agent, such as 18-Crown-6, is preferably used to improve the solubility of the metal azide (e.g., potassium azide, sodium azide) in acetonitrile. The preferred solvent is triethylene glycol. While the reaction may be run in triethylene glycol over a range of from room temperature to reflux, it is preferably run at a temperature of from 120° to 130° C. under a vacuum of from about 10 to about 7 mm Hg. When this is done, the product 3-azidooxetane is distilled off as it is formed. Small amounts of triethylene glycol that are codistilled with the product are removed by treating the product with a small amount of calcium chloride.

The 3-oxetyl p-toluenesulfonate, used as a starting material, can be prepared according to the method illustrated in example 1.

A Lewis acid is used to polymerize 3-azidooxetane in a polar aprotic solvent to form poly(3-azidotrimethylene ether).

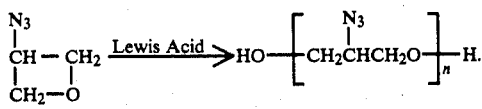

Polar aprotic solvents which may be used include acetonitrile, methylene chloride, 1,2-dichloroethane, 1,1,2-trichloroethane, chloroform, and nitromethane, with methylene chloride being more preferred. Preferred among the Lewis acid catalysts are phosphorus pentafluoride and boron trifluoride with boron trifluoride being more preferred.

The average molecular weight of the product polymers is controlled by selecting a given molar ratio of Lewis acid catalyst to 3-azidooxetane. Preferably the molar ratio of Lewis acid to 3-azidooxetane is from about 1:100 to about 3:20 and more preferably from 1:20 to 1:10. The average molecular weight of the poly(3-azidotrimethylene ether) polymers is from about 1500 to about 5000 and preferably from 2000 to 3500.

As is illustrated by example 7, the poly(3-azidotrimethylene ether) polymers react, as do conventional hydroxy terminated polyethers, with equivalent amounts of diisocyanates to form polyurethanes. In example 7, toluene diisocyanate worked well as the curing agent. However, many other aromatic and aliphatic diisocyanates commonly used to form polyurethanes from hydroxy terminated polyethers may also be used.

The energetic, rubbery, polyurethanes formed may be used as energetic binders in explosives and propellants.

The general nature of the invention having been set forth, the following examples are presented as specific illustrations thereof. It will be understood that the invention is not limited to these specific examples, but is susceptible to various modifications that will be recognized by one of ordinary skill in the art.

EXAMPLE 1

3-oxetyl p-toluenesulfonate (i.e., 3-oxetyl tosylate)

To a stirred suspension of 315 g of 3-hydroxyoxetane (3.4 Moles) and 743 g (3.9 moles) of technical grade p-toluenesulfonyl chloride in 600 mL of water, was added dropwise, over a period of 25 minutes a solution of 218 g (5.45 moles) of sodium hydroxide in 225 mL of water. The reaction was exothermic and ice bath cooling was used to keep the reaction temperature below 70° C. When the exothermic reaction subsided (10 minutes), the cooling bath was removed and the reaction temperatures was allowed to decrease to 40° C. over a 1 hour period. The product was isolated by filtration, washed with four 200 ml portions of warm (45°-55° C.) water, and air dried to give 730 g (94% yield) of 3-oxetyl tosylate, mp 86°-88° C.

EXAMPLE 2

3-Azidooxetane (Hexamethylphosphoramide solvent)

A solution of 7.31 g (0.032 mole) of 3-oxetyl tosylate and 2.80 g (0.034 mole) of potassium azide in 80 ml of hexamethylphosphoramide was stirred at 87° C. for 6 hours and was then allowed to stand overnight at room temperature. The precipitate of potassium tosylate was filtered, and the filtrate was vacuum distilled to afford 1.86 g of 3-azidooxetane, bp 86°-95° C. (49 mm) that was 92% pure on the basis of NMR (50% yield). Preparative gc (9% QF-1 on Chromasorb W; 100°) afforded an analytical sample of 3-azidooxetane: $^1$H NMR (CDCl$_3$) δ 4.60 (m,4 H; CH$_2$OCH$_2$); 4.76 (m, 1 H, CH—N$_3$); IR (CH$_2$Cl$_2$) 3000, 2930 (C—H); 2150 (—N$_3$); 980 cm$^{-1}$(oxetane).

Anal. Calcd for C$_3$H$_5$N$_3$O: C, 36.36; H, 5.09; N, 42.41. Found: C, 36.29; H, 4.82; N, 43.06.

EXAMPLE 3

3-Azidooxetane (acetonitrile)

To a solution of 2.28 g (0.01 mole) of 3-oxetyl tosylate in 35 ml of dry acetonitrile was added 0.41 g (0.001 mole) of 18-crown-6 (75% purity) and 1.00 g (0.012 mole) of potassium azide. The solution was heated at reflux for 47 hours and an additional 0.60 g (0.0025 mole total) of 18-crown-6 was added. Heating was continued for an additional 43 hours. After the reaction mixture was cooled to room temperature and filtered, the acetonitrile was distilled and the residue vacuum distilled (65°/40 mm) to afford 0.274 g (28%) of 3-azidooxetane, which was pure on the basis of its NMR spectrum.

EXAMPLE 4

3-Azidooxetane (triethylene glycol)

A stirred mixture of 92 g (0.40 mole) of 3-oxetyl tosylate, 40 g (0.58 mole) of sodium azide and 205 mL of triethylene glycol was heated over a 30 minute period to 120°-130° C. at 7-10 mm Hg in a 1 liter flask fitted with a vacuum distillation head. The product distilled as it was formed, over a 1.5 hour period, providing 34 g (86% yield) of 3-azidooxetane of greater than 98% purity.

EXAMPLE 5

Polymerization of 3-Azidooxetane

To a solution of 0.212 g (2.1 mmol) of 3-azidooxetane in 1.0 mL of methylene chloride cooled with an ice-bath, was added 0.025 mL (0.2 mmol) of freshly distilled boron trifuloride etherate. After 4.5 hours, the resulting yellow solution was quenched with 1.0 mL of pH 7.0 phosphate buffer. The resulting emulsion was broken by the addition of methylene chloride and water. The organic phase was dried and solvent was removed. The residue was dissolved in 4 mL of methylene chloride, and 16 mL of hexane was added to precipitate the polymer. The precipitate, a viscous oil, was dried under vacuum to give 0.092 g (43.4%) of poly(3-azidotrimethylene ether): $^1$H NMR (CDCl$_3$) δ 3.63 (s); IR (CH$_2$Cl$_2$) 3650 (—OH); 2150 cm$^{-1}$ (—N$_3$); mol wt (VPO, ethyl acetate, 35° C.) 2100; functionality was 2.0.

EXAMPLE 6

Polymerization of 3-Azidooxetane

Boron trifluoride etherate (10.8 g, 0.076 mole) was added with stirring and ice-bath cooling to a solution of 150 g (1.52 moles) of 3-azidooxetane in 1050 mL of dry methylene chloride. The reaction temperature rose from 5° C. to 21° C. over a 10 minute period and then returned to 5° C. After 4.5 hours 45 mL of 2 M sodium carbonate solution was added and the mixture was stirred for 30 minutes. The methylene chloride layer was separated, dried over magnesium sulfate, and was added with stirring to 1100 mL of hexane. The mixture was allowed to stand for 3 hours, and, after the solvent was decanted, the precipitate was dried to give 82.2 g (55%) of polymer. The molecular weight by vapor pressure osmometry was 3110, and the functionality was 2.0.

EXAMPLE 7

Polyurethane Formation

A solution of 2.49 g (0.845 mmole) of 3-azidooxetane polymer (molecular weight 2950), 0.147 g (0.845 mmole) of toluenediisocyanate and a trace of ferric acetylacetonate in 25 mL of methylene chloride was allowed to stand at room temperature for 5 days. Removal of the solvent left a resilient rubbery polymer.

A similar reaction was carried out using only a minimum amount of methylene chloride to mix the components. The reaction was complete in 10 minutes, and the product was identical to the above rubber.

The general nature of the invention having been set forth, the following examples are presented as specific illustrations thereof. It will be understood that the invention is not limited to these specific examples, but it susceptible to various modifications that will be recognized by one of ordinary skill in the art.

We claim:

1. A poly(3-azidotrimethylene ether) of the formula

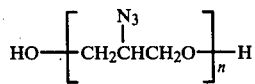

wherein n is selected to provide an average molecular weight of from about 1500 about 5000 for the polymer.

2. The poly(3-azidotrimethylene ether) of claim 1 having an average molecular weight of from 2000 to 3500.

3. A method for preparing a poly(3-azidotrimethylene ether) of the formula

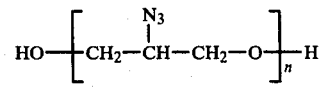

comprising the steps of:
(1) dissolving 3-azidooxetane in a polar aprotic organic solvent;
(2) adding a Lewis acid to the solution to catalyze the polymerization of 3-azidooxetane to form the poly(3-azidotrimethylene ether); and
(3) isolating the product poly(3-azidotrimethylene ether).

4. The process of claim 3 wherein the polar aprotic organic solvent is selected from the group consisting of acetonitrile, methylene chloride, 1,2-dichloroethane, 1,1,2-trichloroethane, and chloroform.

5. The process of claim 4 wherein the polar aprotic organic solvent is methylene chloride.

6. The process of claim 3 wherein the Lewis acid catalyst is selected from the group consisting of boron trifluoride, phosphorus pentafluoride.

7. The process of claim 6 wherein the Lewis acid catalyst is boron trifluoride.

8. The process of claim 6 or 7 wherein the molar ratio of Lewis acid catalyst to poly(3-azidotrimethylene ether) is from about 1:100 to about 3:20.

9. The process of claim 6 or 7 wherein the molar ratio of Lewis acid catalyst to poly(3-azidotrimethylene ether) is from 1:20 to 1:10.

* * * * *